United States Patent [19]

Priest et al.

[11] 3,998,188
[45] Dec. 21, 1976

[54] HEATER FOR HEATING A FLUID

[75] Inventors: Ernest Horace Priest, Horsham; Gordon Michael Priest, Slinfold, both of England

[73] Assignee: Beverley Chemical Engineering Company, Ltd., Sussex, England

[22] Filed: Apr. 13, 1971

[21] Appl. No.: 133,696

[52] U.S. Cl. .................. 122/250 R; 122/356; 122/494; 126/109
[51] Int. Cl.² .................. F22B 21/26
[58] Field of Search ............ 126/109; 122/24, 161, 122/169, 250 R, 356, 367 R, 367 C, 494

[56] References Cited
UNITED STATES PATENTS

| | | | |
|---|---|---|---|
| 1,948,536 | 2/1934 | Noack | 122/24 |
| 1,980,425 | 11/1934 | Morgan | 122/169 |
| 2,361,812 | 10/1944 | Barnes | 122/356 |
| 2,625,917 | 1/1953 | Barnes | 122/250 |
| 2,787,256 | 4/1957 | Ilune | 122/161 |
| 3,143,102 | 4/1964 | Wahl et al. | 122/494 |

FOREIGN PATENTS OR APPLICATIONS 1,091,306   10/1960   Germany ............ 122/250

Primary Examiner—Kenneth W. Sprague
Attorney, Agent, or Firm—Ostrolenk, Faber, Gerb & Soffen

[57] ABSTRACT

In order to improve the efficiency of a heater for heating a fluid using hot products of combustion, a second heat exchanger is connected to a first heat exchanger, the first heat exchanger absorbing primarily radiant heat from the hot products of combustion and the second heat exchanger absorbing primarily convected heat from the hot products of combustion. The hot products of combustion either pass through an array of parallel tubes in the second heat exchanger, or the second heat exchanger is inserted into the end of the first heat exchanger.

1 Claim, 8 Drawing Figures

HEATER FOR HEATING A FLUID

This invention relates to a heater for heating a fluid using hot products of combustion (gases). The fluid to be heated may in particular be a heat-transfer liquid, e.g. a molten salt or concentrated salt solution, or a heat-sensitive organic heat-transfer liquid, which liquid is to be heated to a relatively high temperature of, say at least 200° C and say, 300°–520° C for a salt heat-transfer liquid or up to 400° C for an organic heat-transfer liquid. Heaters of this general type are disclosed in, for instance, British Patent Specifications Nos. 1,018,843, 1,176,473, 1,176,474, 1,176,475.

The products of combustion leaving a single heat exchanger normally are still hot and contain usable heat; if the heat exchanger is made more complex or larger in order to remove more heat, the cost of the heat exchanger is greatly increased.

It is an object of the invention to provide a heater in which the cost of the basic heat exchangers is not substantially increased.

In general terms, in accordance with the invention, a second heat exchanger is connected to outlet opening(s) from the combustion chamber of the first heat exchanger, for passing the fluid to be heated in heat-exchange relationship with the combustion products to remove further heat therefrom, the fluid absorbing primarily radiant heat from the combustion products in the first heat exchanger and absorbing primarily convected heat from the combustion products in the second heat exchanger. As will be apparent hereafter, the second heat exchanger can either have a number of parallel tubes connected to the combustion chamber of the first heat exchanger for the passage of hot products of combustion therethrough, and ducts extending transversely of the tubes for passing said fluid over the exterior of said tubes, or, alternatively, be part of an arrangement in which the first heat exchanger and the second heat exchanger are generally co-axial with the second heat exchanger on the end of the first heat exchanger, the side wall(s) of a combustion chamber of the first heat exchanger extending beyond the combustion products outlet(s) from the combustion chamber, the end wall of the combustion chamber being provided by a partition in which the outlet(s) is/are defined, the second heat exchanger being in and partly formed by the extension of the side wall(s).

The invention enables the second heat exchanger to be designed for high efficiency in absorbing convected heat and the first heat exchanger to be designed for high efficiency in absorbing radiant heat, thus increasing the overall efficiency. For instance, the flow passage(s) for the combustion products can have a substantially larger cross-section in the first heat exchanger than in the second heat exchanger, the normal arrangement being for the first heat exchanger to have the single combustion chamber (flow passage) and for the second heat exchanger to have a number of parallel-connected flow passages. A further advantage of the arrangement is that the second heat exchanger can be detachable or removable, or at least more accessible for cleaning than the first heat exchanger. The combustion products tend to foul the second heat exchanger more than the first due to their reduced temperature in the second heat exchanger.

There is preferably a large (preferably axial) outlet from the first heat exchanger, and in general the outlet(s) of the first heat exchanger can lead directly into the second heat exchanger. The second heat exchanger preferably has a plurality of parallel tubes through which the combustion products are to pass, the fluid to be heated being arranged to flow transversely across the outside of the tubes. As the internal walls of the tubes will be more subject to corrosion and fouling than the external walls, the second heat exchanger is thus much easier to clean. In addition, the tubes can be of relatively small size and produce high velocities therein, giving a high co-efficient of heat transfer.

The first and second heat exchangers are preferably in series as regards the flow of the fluid to be heated; however, there may be a small by-pass vent in part short-circuiting the heat exchanger for venting air or vapour, provided the bulk of the flow passes through the second heat exchanger. The flow of the fluid to be heated is preferably (but not necessarily) in generally the same direction as that of the combustion products because the combustion products preferably flow generally upwards and because the fluid to be heated, if a liquid, preferably flows generally upwards to avoid trapping air or vapour.

The first and second heat exchangers may have parallel axes, for instance the exchangers being side by side or one on top of the other with the flow path of combustion products being along the first heat exchanger and back along the second heat exchanger, roughly in a U-shape. On the other hand, the heat exchangers may be generally co-axial with the second heat exchanger on the end of the first heat exchanger, say bolted on the end thereof. In one such arrangement, the side wall(s) of a combustion chamber of the first heat exchanger may extend beyond the combustion products outlet(s) from the combustion chamber, the end wall of the combustion chamber being provided by a partition in which the outlet opening(s) is/are defined, the second heat exchanger being in and partly formed by the extension of the side wall(s), for instance in the form of a set of withdrawable duct means for the flow of the fluid to be heated, inserted into the end of the extension. The outlet opening(s) from the second heat exchanger need not be axially symmetrical. In general, the second heat exchanger may be on top of the first heat exchanger.

If desired, a third heat exchanger may be incorporated for removing further heat from the combustion products after they leave the second heat exchanger, particularly in the arrangement described in the preceding paragraph.

There may be a double-header arrangement for fluid to be heated on the outside of the end wall of the second heat exchanger in the arrangement described in the last but one paragraph, the double-header arrangement having an inlet for fluid to be heated, an outlet for heated fluid, and flow and return connections in said end wall for flow ducts forming part of the second heat exchanger, the double-header arrangement being divided approximately diametrically by a first partition and having a further partition substantially parallel to and spaced a small distance from the end wall (whether the end wall is flat or curved in longitudinal section), dividing the double-header arrangement into main inlet and outlet headers (communicating with said inlet and said outlet respectively) and narrow flow and return chambers, the communications between the inlet header and the flow chamber and between the return chamber and the outlet header being by way of communication openings in said further partition adjacent the periphery of the respective flow or return chamber, and preferably adjacent the periphery of the double-header arrangement, and said flow and return connections communicating with the flow and return chambers at positions remote from said communication openings; in this manner, a high flow velocity can be obtained over the end wall, which is particularly important since the end wall can be one of the hotter parts of the heater; furthermore, no refractory insulation is necessary because the relatively stagnant fluid in the inlet and outlet headers insulates the narrow flow and return chambers, and an insulation of glass fibre or asbestos can be used around the outside of the double-header arrangement. If the flow and return connections for the second heat exchanger pass through the end wall at positions which are not remote enough from said communications, they can be connected to flow ducts running parallel to the end wall and opening into the respective flow or return chamber at positions remote from said communications; the flow ducts can be formed by trough-shaped members with their otherwise open sides closed by the end wall.

In general, the (preferably cylindrical) combustion chamber of the first heat exchanger may be of large cross-sectional area, with duct means for the fluid to be heated around, say helically wound (single or multi-start) around, or running longitudinally along, the outside of the combustion chamber. The helically wound duct means gives an extended fluid path and good heat transfer, and the helix could decrease in diameter at one or both ends to form a "wet" end or ends. The side wall(s) of the combustion chamber may be extended by protuberances (e.g. fins) extending into the duct means and preferably extending right across or at least half way across the duct means, giving good heat transfer efficiency. A heavy gauge casing may be around and be spaced from the protuberances to contain the pressure of the fluid to be heated, and a thin gauge casing lying around and close to (and preferably in contact with) the protuberances. In this manner, the protuberances can project all the way or nearly all the way across the effective duct while avoiding the difficulty of mounting a heavy gauge casing close to the protuberances. The thin gauge casing can be wrapped around the protuberances, but does not have to contain any pressure. The fluid in the space between the two casings may be substantially static.

In the arrangement referred to above where the second heat exchanger is in an extension of the combustion chamber, the duct means may continue along the outside of the side wall(s) forming the extension.

In general, the heaters of the invention can be arranged for heating a high pressure fluid, say having pressures of 50 p.s.i. (3.5 Kg/cm) and up to 100 p.s.i. (7 Kg/cm) or more, without any leakage of the fluid to be heated to the outside or to the ducts or the products of combustion. For constructional reasons, one or both of the end walls referred to above may be curved, as seen in longitudinal section, so as to prevent a concave internal surface.

Duct means can be provided for passing the fluid to be heated over the outside of one or both end walls of the first heat exchanger and/or of the second heat exchanger, and the external surface of the respective end wall can be extended with protuberances, e.g. fins, if desired.

The invention will be further described by way of example, with reference to the accompanying drawings, in which.

Figure 1:
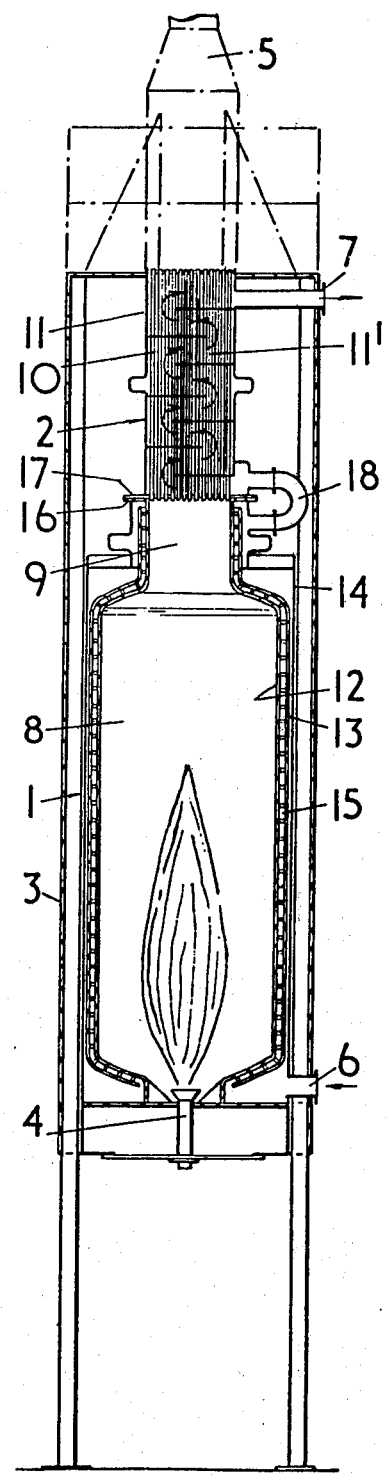
FIG. 1 is a longitudinal section through a first heater in accordance with the invention.

The heaters shown in the drawings all have a radiant section (first heat exchanger) 1 and a convection section (second heat exchanger) 2 contained in a single outer casing 3. There is a gas or oil burner 4 and an outlet stack 5 for products of combustion. There is an inlet 6 for a heat-transfer liquid (say a salt or an organic liquid) and an outlet 7 for the liquid. In all the heaters, the radiant section 1 has a generally cylindrical combustion chamber 8 with a wide axial outlet 9. In the heaters of FIGS. 1 to 4 and 8, the convection section is formed by concentric rings of parallel tubes 10 through which the products of combustion pass, contained in a shell 11 having baffles 11' for guiding the heat-transfer liquid flow in a generally zig-zag path transverse to the tubes 10.

In the heater of FIG. 1, the combustion chamber 8 is formed by a generally bottle-shaped shell 12 within an intermediate thin gauge wall (e.g. 16 gauge) shell 13 and a cylindrical heavy gauge wall shell 14. A large number of fins 15 are secured to the shell 12 and extend right across the annulus between the shells 12, 13. On start-up, heat-transfer liquid entering the inlet 6 can flow up the annulus between the shells 12, 13, and also fill the annulus between the shells 13, 14, two one-quarter inch (about 6 mm) bores (not shown) being provided at the top of the latter space to vent the space into the flow path of the liquid and prevent air locks forming.

The top of the shell 12 carries a flange 16 to which the flange 17 of the convection section 2 is bolted, with the interposition of a suitable gasket; the heat-transfer fluid is passed from the radiant section 1 to the convection section 2 by means of a U-elbow 18.

The radiant section 1 and convection section 2 can be insulated with a layer of say fibre glass or asbestos.

Figure 2:
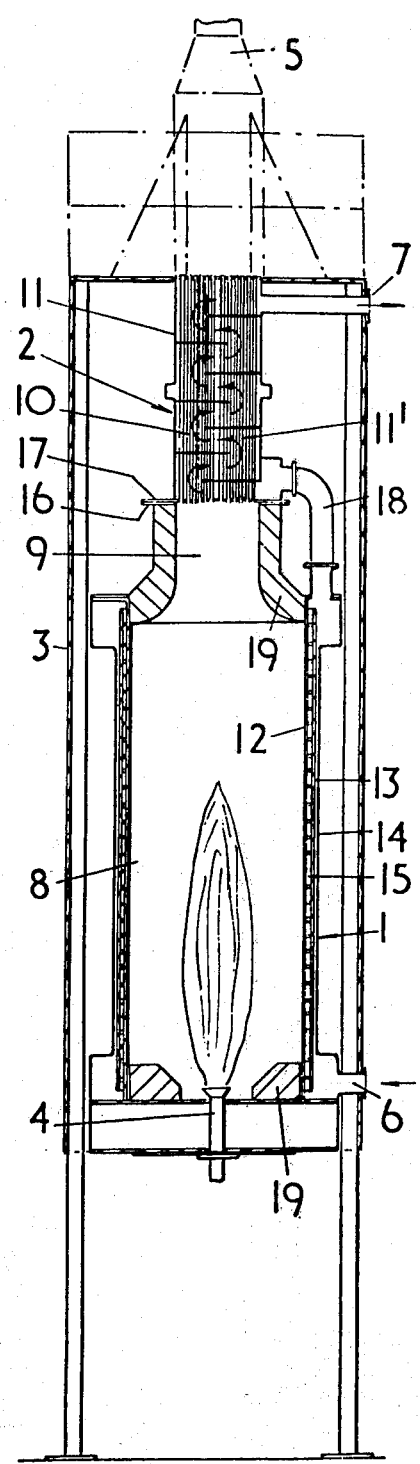
FIG. 2 is a longitudinal section through a second heater in accordance with the invention.
Figure 3:
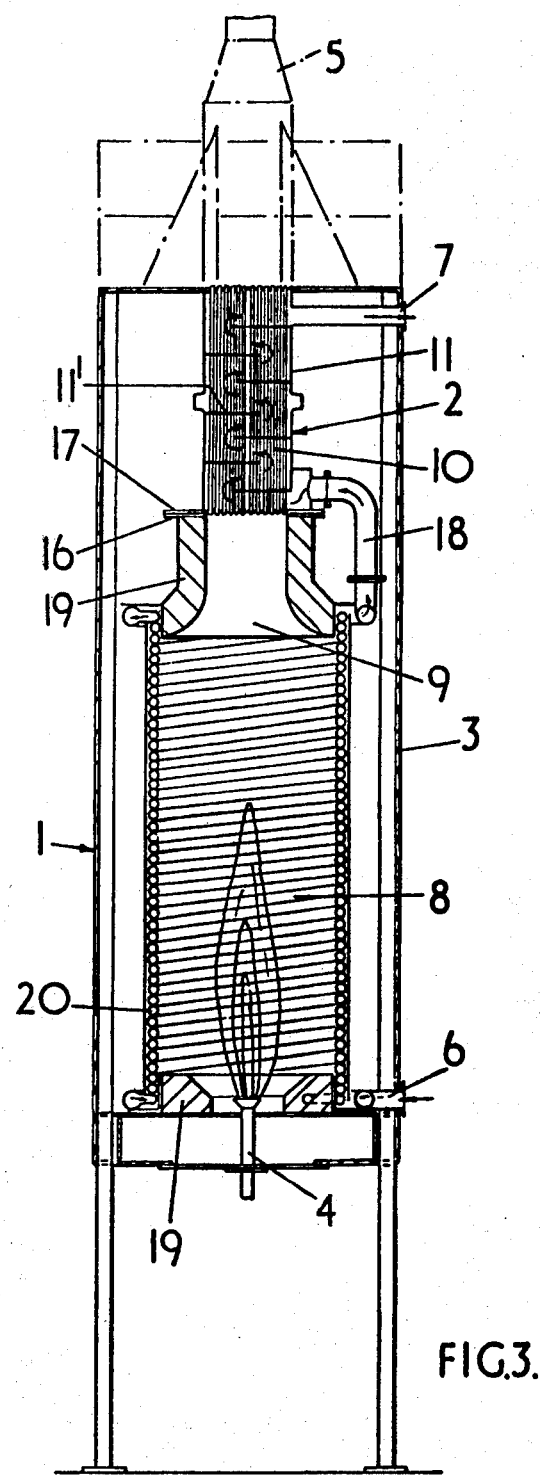
FIG. 3 is a longitudinal section through a third heater in accordance with the invention.
Figure 4:
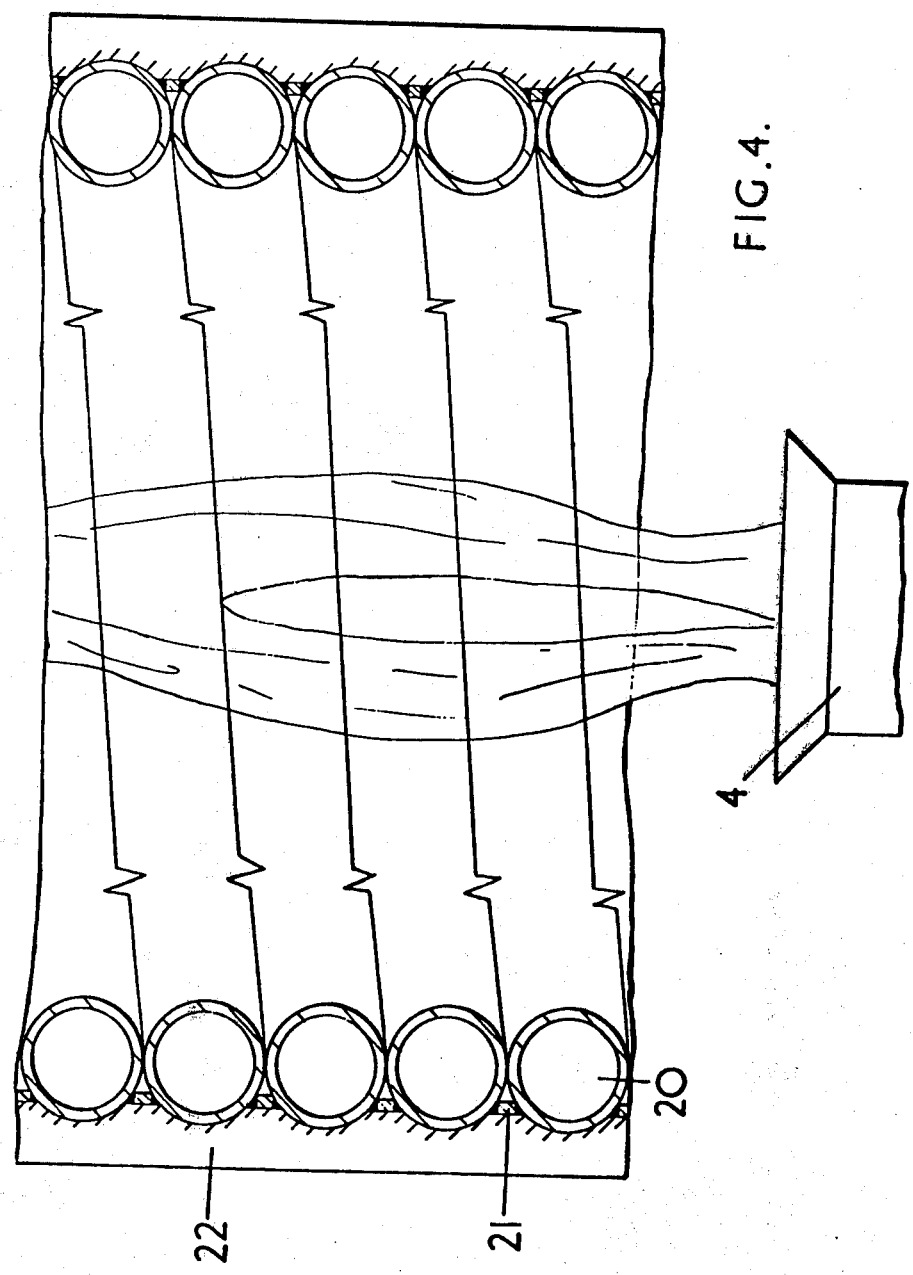
FIG. 4 is a detail (in longitudinal section) of the heater of FIG. 3.

The heaters of FIGS. 2 to 4 are generally similar to that of FIG. 1, and the same reference numerals are used for identical or similar parts.

The general construction of the radiant section 1 of the second heater (FIG. 2) is similar to that of the first heater except that it does not have wet ends, having rings 19 of refractory at the ends. This reduces the cost of manufacture of the heater, though the heat-exchange efficiency may be decreased; the disadvantage of the use of such refractory is that it can suddenly disintegrate.

The third heater (FIGS. 3 and 4) has the refractory rings 19 as in the second heater (FIG. 2), but the construction of the radiant section 1 is otherwise different, as shown more clearly in FIG. 4.

The well of the combustion chamber is formed by a single or multi-start helical tube 20. Such tubes can be arranged to withstand very high pressures. Adjacent coils of the tube 20 are in close contact, and in order to provide a perfect seal, helical fillets 21 bridge between the coils, as shown in FIG. 4. The assembled nest of coils is secured by a series of longitudinal braces 22 which are welded to the tubes 20 and to the fillets 21. The heater can be insulated with fibre glass or asbestos insulation which does not retain heat and need only withstand a temperature of about 520° C. It will be noted that if the gases were allowed to pass between the tubes 20, the insulation would have to stand gas temperatures of up to 1500° C and require very thick refractory.

In the fourth heater (FIG. 5), the combustion chamber 8 is terminated by a baffle plate 24 of say high temperature alloy or ceramic, carried on an annular flange 25; there is no large pressure difference at this point and perfect sealing is not required. The shell 26 of the combustion chamber 8 has an extension forming part of the convection section 2. The shell 26 is enclosed within an outer shell 27, fins 28 being secured to the shell 26 and extending right across the annulus to the outer shell 27. Heat-transfer liquid is passed down the annulus and through a U-pipe 29 into a double-header arrangement 30.

The shell 26 carries a flange 31 to which is bolted (with the interposition of a suitable gasket) a flange 32 carrying the double-header arrangement 30 and multi-start helical tubes 33 for carrying the heat-transfer liquid through the convection section 2.

The double-header arrangement 30 is divided by an unapertured longitudinal partition 34 and by a transverse partition 35 having two arcuate cut-outs 35' (see FIG. 6); the arrangement incorporates a flat end plate 36 which must be sufficiently thick to withstand the pressure of the heat-transfer liquid. The tubes 33 have return and flow connections passing through the end plate 36, and the end plate thereby mounts the tubes 33. Trough-shaped ducts 36' (not shown in FIG. 5 — see FIG. 7) are sealed to the end plate 36 so that one end of each duct overlies the respective flow connection where the connection opens through the end plate 36 and the other end of the duct 36' terminates adjacent the periphery of the double-header arrangement (see FIG. 6). This ensures that in order to enter the tubes 33, the heat-transfer liquid must flow up the narrow chamber between the transverse partition 35 and the end wall 36 until it is adjacent the top; in any case, when leaving the tubes 33 the heat-transfer liquid flows from adjacent the bottom and up the narrow chamber between the transverse partition 35 and the end plate 36, giving a good velocity flow across the end plate 36 and preventing over heating of the end plate 36.

It will be seen that the combustion products enter the convection section 2 through the axial opening (outlet) 9 and leave through the radial stack (connection) 5.

The radiant section 1 of the fifth heater (FIG. 8) is generally similar to that of the second heater, except that one of the refractory rings is replaced by a refractory (or otherwise insulated) back end 37 which is removable for cleaning and also provides a duct leading between the radiant section 1 and the convection section 2. Alternatively, the radiant section 1 of the fifth heater could have the helical tube arrangement of FIGS. 3 and 4. The outlet 9 from the combustion chamber proper can be considered to be axially symmetrical. The duct for combustion products leads into a venturi section 38 in order to straighten the gas flow of the combustion products before they pass into the convection section 2. The venturi section 38 makes a flanged connection with the convection section 2, and a door 39 at the other end of the convection 2 can be removed for cleaning the stack or for cleaning the tubes 20 of the convection section 2.

Figure 8:
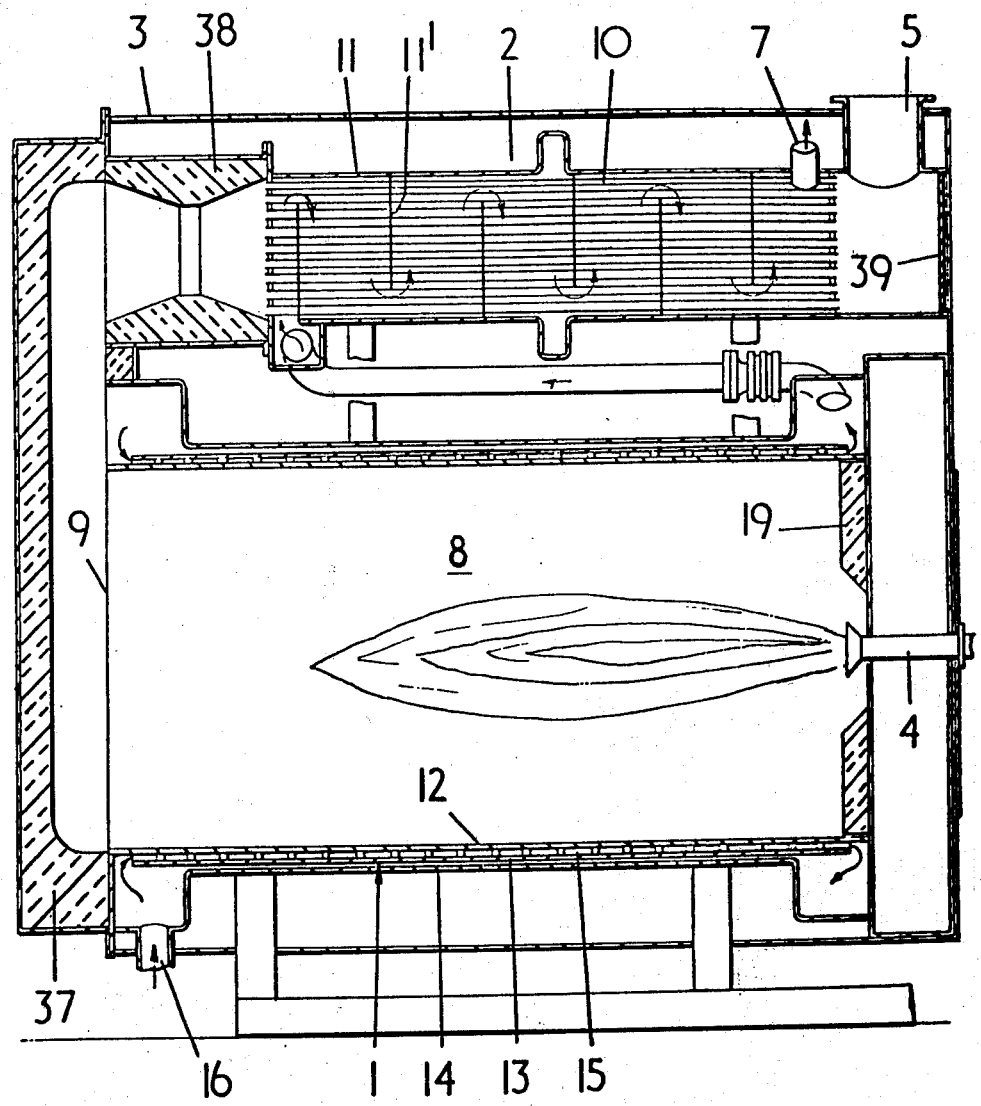
FIG. 8 is a longitudinal section through a fifth heater in accordance with the invention.

A venturi section similar to that in FIG. 8 could be incorporated between the radiant section 1 and convection section 2 of any of the heaters, for straightening gas flow.

Figure 5:
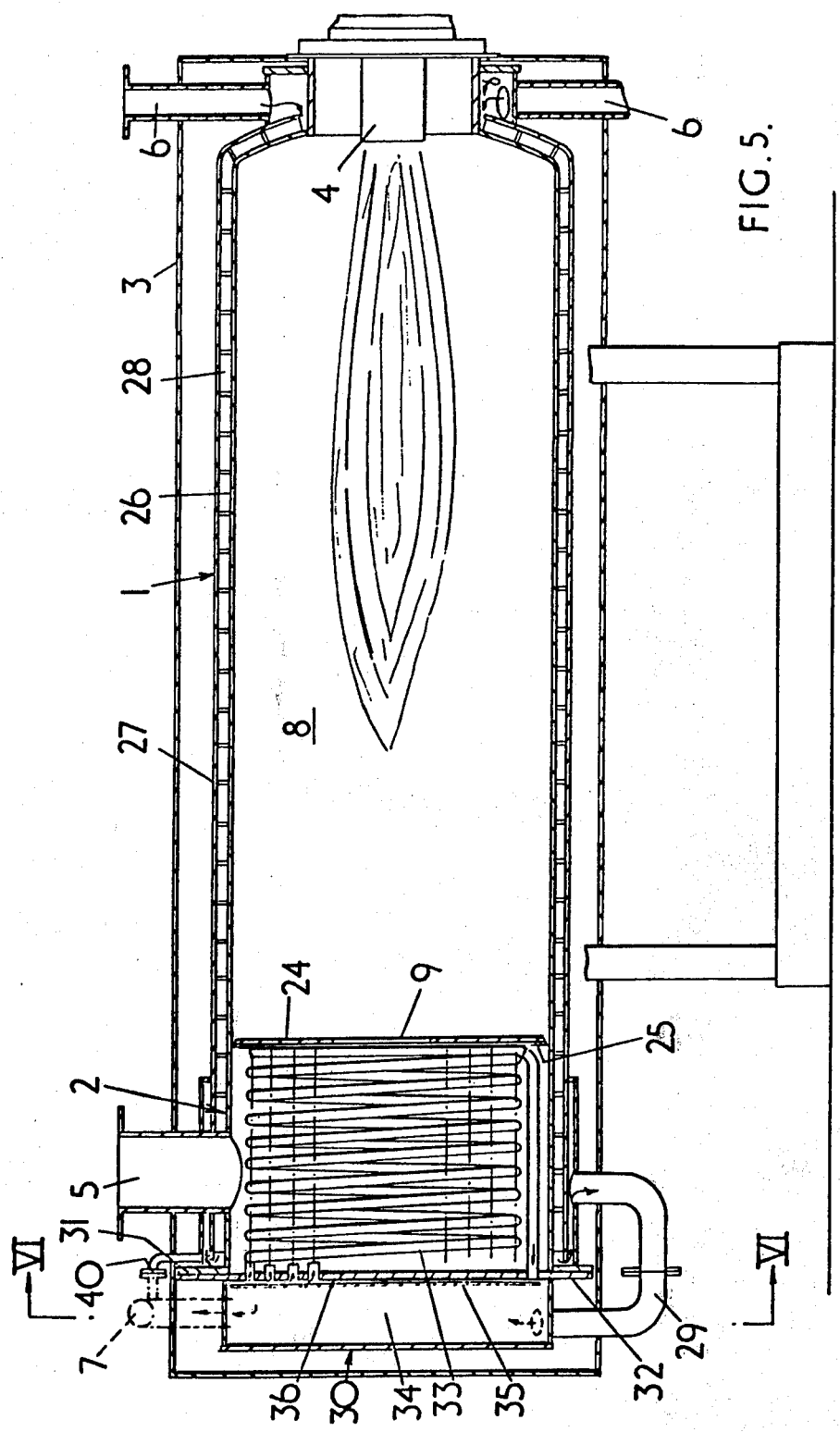
FIG. 5 is a longitudinal section (along the line V—V of FIG. 6) through a fourth heater in accordance with the invention.
Figures 6, 7:
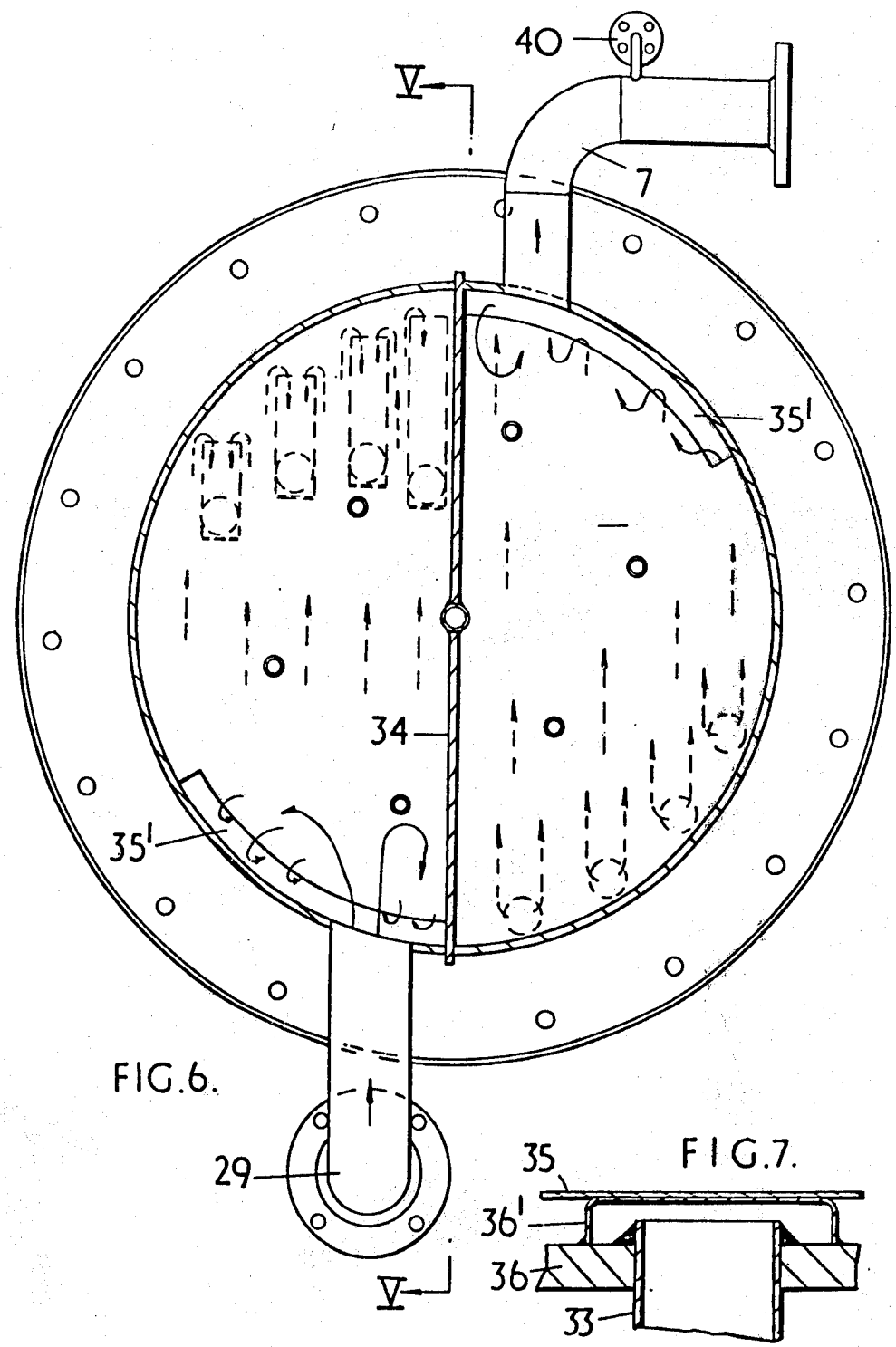
FIG. 6 is a transverse section along the line VI—VI of FIG. 5.
FIG. 7 is a detail of a flow duct in FIGS. 5 and 6.

In all the heaters shown, the convection section 2 is in series with and downstream of the radiant section 1 as regards the flow of heat-transfer liquid, though the direction of flow may be reversed if desired. The heaters may be in the orientation shown, but alternatively any of the heaters could be in any other suitable orientation. For instance, the heater of FIG. 5 could be vertical or the heaters of FIGS. 1 to 4 and 8 could be upside down if suitable arrangements were made for exhausting the products of combustion. If necessary to prevent air or vapour locks, a vent may be provided short-circuiting a small proportion of the liquid to by-pass the convection section 2. Such a vent is shown at 40 in the fourth heater (FIG. 5).

We claim:
1. A heater for heating a fluid using hot products of combustion, the heater comprising
   at least one combustion chamber having side wall means and end wall means, one said end wall means being defined by partition means, said side wall means extending beyond said partition means to form an extension,
   a burner for burning a fuel in said combustion chamber and passing the hot products of combustion therethrough,
   duct means associated with said side wall means of said combustion chamber for the passage of fluid to be heated in heat-exchange relationship with the hot products of combustion in said combustion chamber,
   outlet opening means in said partition means for the hot products of combustion to leave said combustion chamber,
   and a heat exchanger means coaxial with said combustion chamber, said heat exchanger means comprising duct means within said extension for passing fluid in heat-exchange relationship with the hot products of combustion to remove further heat therefrom, whereby said combustion chamber forms part of and defines said heat exchanger means which comprises a first heat exchanger in which fluid absorbs primarily radiant heat from the hot products of combustion and a second heat exchanger, wherein fluid absorbs primarily convected heat from the hot products of combustion,
   said second heat exchanger comprises an end wall remote from said first heat exchanger and further comprises a double-header arrangement for fluid on the outside of said end wall of said second heat exchanger, the said double-header arrangement comprising
   chamber means,
   an inlet for fluid to be heated,
   an outlet for heated fluid,
   flow and return connections defined in said end wall for said flow ducts of said second heat exchanger, a first partition dividing said chamber means approximately diametrically, a second partition substantially parallel to and spaced a small distance from said end wall of said second heat exchanger, said first and second partitions dividing said chamber means into main inlet and outlet headers and narrow flow and return chambers, first openings defined in said second partition adjacent the periphery of said chamber means to provide respective communications between said inlet header and said flow chamber and between said return chamber and said outlet header, and further openings remote from said first openings to provide respective communications between said flow and return connections and said flow and return chambers.

* * * * *